Aug. 30, 1938.   F. P. SNOW   2,128,542
WATER GATE
Filed April 26, 1935   2 Sheets-Sheet 1

Inventor
Frank P. Snow
By Lyon & Lyon
Attorneys

Aug. 30, 1938.     F. P. SNOW     2,128,542
WATER GATE
Filed April 26, 1935     2 Sheets-Sheet 2
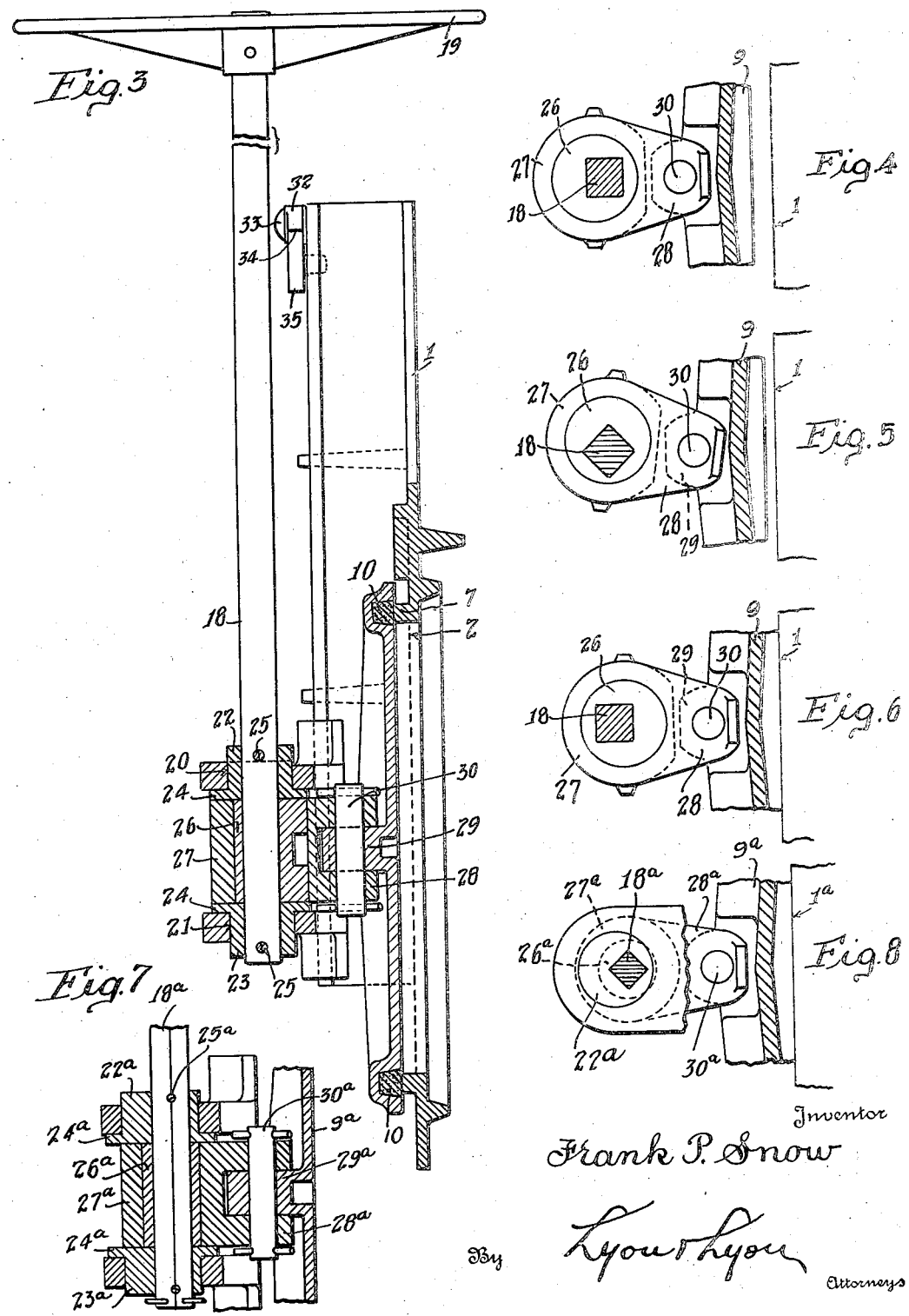
Inventor
Frank P. Snow
By Lyon & Lyon
Attorneys Patented Aug. 30, 1938

2,128,542

UNITED STATES PATENT OFFICE 2,128,542

WATER GATE

Frank P. Snow, Los Angeles, Calif., assignor to Snow Manufacturing Co., Los Angeles, Calif., a corporation of California Application April 26, 1935, Serial No. 18,327

2 Claims. (Cl. 251—56)

This invention relates to water gates, and particularly to "slide gates", as they are usually called, a type of head gate having a valve or cover-plate that may be shifted vertically to either partly or wholly cover the water opening and locked in any desired position.

An object of the invention is to provide a gate of the general type referred to, that (1) is easily operated; (2) closes tightly; (3) is durable and always reliable; and (4) is relatively inexpensive to manufacture.

The construction of my head gate will now be described with reference to the drawings, in which Fig. 1 is a front elevation view of a head gate in accordance with the invention;

Fig. 3 is a vertical sectional view of the same gate, taken in the plane III—III of Fig. 1;

Figs. 4, 5 and 6 are schematic drawings illustrating the operation of the gate illustrated in Figs. 1 to 3;

Fig. 7 is a vertical sectional view of a portion of a gate, showing an alternative construction to that shown in Figs. 1 to 6; and Fig. 8 is a schematic view illustrating the operation of the construction shown in Fig. 7.

Figure 1:
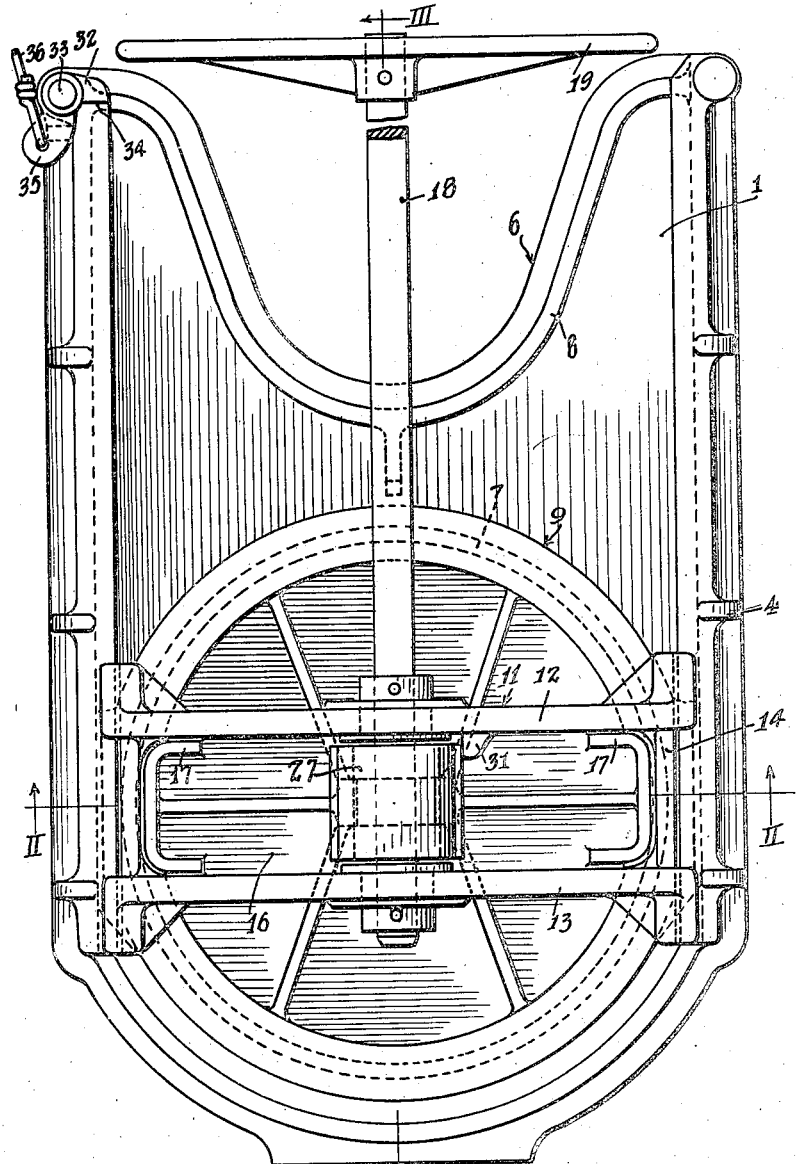

In the description, the side of the gate shown in Fig. 1 will be referred to as the front side, and the reverse side will be referred to as the rear side.

Figure 2:
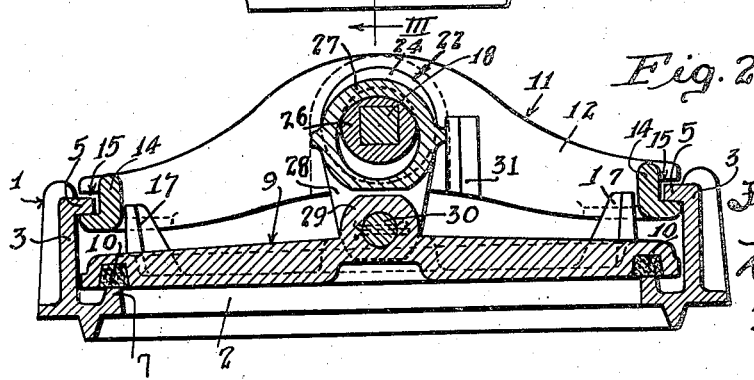
Fig. 2 is a cross-sectional view of the gate in the plane II—II of Fig. 1.

Referring to Figs. 1, 2 and 3, my preferred gate construction comprises a stationary base-plate 1 having a circular aperture 2 therein, which constitutes the water passage, and having forwardly extending side walls 3 which extend vertically parallel to each other on opposite edges of the base-plate 1. The side walls 3 may be reinforced by ribs 4 to increase their strength and rigidity. The front edge of each of the side walls 3 is extended inwardly to constitute a guiding flange 5 for the cover-plate supporting mechanism. To save metal the central upper portion of the base-plate 1 may be cut away, as indicated at 6.

The base-plate at the periphery of the water passage 2 is extended forwardly to constitute a flange 7 which is raised with respect to the main body of the base-plate 1. The surface of the flange 7 is preferably machined to provide a flat, smooth valve seat to seal with the valve or cover-plate. A flange 8 is also preferably provided adjacent the upper margin of the base-plate 1, this flange extending forward of the surface of the base-plate substantially the same distance as the flange 7 to serve as a rest for the cover-plate when the latter is locked in partially or fully opened position.

To close the opening 2, a valve or cover-plate 9 is provided, which is of approximately circular shape and slightly larger in diameter than the flange 7 constituting the valve seat. The cover-plate is preferably recessed on the rear side, adjacent its periphery, to receive a packing member 10 of resilient material which registers with the valve seat and seals therewith when the gate is locked in closed position.

The cover-plate 9 is supported upon a carriage 11 which comprises an upper and a lower cross member 12 and 13, respectively, which are connected together at their outer ends by vertical portions 14, which are provided with grooves 15 for slidably engaging the guide flanges 5 so that the carriage is free to slide vertically with respect to the base-plate 1. The portions 12, 13 and 14 of the carriage 11 define a rectangular window 16, and the cover-plate 9 is provided on its frontal face, and on opposite sides with forwardly projecting guides 17 which are slidable into the window 16 and loosely engage the carriage at the corners of the window 16. It will be observed, therefore, that the cover-plate 9 is supported for free sliding movement toward and away from the base-plate 1 in the carriage 11.

To shift the carriage 11 vertically, and to shift the cover-plate 9 forward and backward with respect to the carriage 11, a mechanism is provided comprising a vertical shaft 18, which is preferably square in cross-section, having mounted on its upper end either a bar handle or a hand-wheel 19. The shaft 18 may be of any desired length, depending upon the conditions under which the gate is to be used. However, at its lower end the shaft 18 passes through bearing holes or bores 20 and 21, respectively, in the upper and lower carriage members 12 and 13, respectively. The apertures 20 and 21 are substantially larger in diameter than the shaft 18 and bushings 22 and 23 are therefore provided between the shaft and the apertures. Each of the bushings 22 and 23 has a square central hole dimensioned to snugly receive the shaft 18 and its outside dimensions are such as to provide a smooth turning fit within the aperture 20 or 21. Each bushing is further provided with an outwardly extending flange 24 and may be secured to the shaft by a cotter pin 25.

Mounted upon the shaft 18, between the flanges 24 on the bushings 22 and 23, respectively, is an eccentric 26, this eccentric having a square opening to snugly receive the shaft 18 so that they turn in unison. The eccentric is maintained in position vertically by contact against the flanges 24 on the bushings 22 and 23. Surrounding the eccentric 26 and enclosing it is a circular strap 27 having a bifurcated arm 28 extending rearwardly therefrom, which arm is pivotally connected to a forwardly extending ear 29 on the cover-plate 9 by a pin 30.

By rotating the shaft 18 and the eccentric 26 through 180°, the eccentric collar 27 and the gate 9 may be shifted forward or backward a distance equal to twice the eccentricity of the eccentric 26. Thus, referring to Fig. 4, the eccentric 26 is shown in position with the gate 9 fully retracted from the base-plate 1. In Fig. 5 the eccentric has been rotated through 90° to partially close the cover-plate 9, and in Fig. 6 the eccentric 26 has been rotated through 180° from the position shown in Fig. 4 to fully close the cover-plate, in which position, if the gate is in the lowermost position, opposite the opening 2, the gasket 10 in the cover-plate will be compressed firmly against the valve seat 7.

The gate may be very easily operated and yet urges the cover-plate against the base-plate with great force by reason of the fact that the eccentric 26 is approaching dead-center position in fully locked position, as shown in Fig. 6, under which conditions a rotation of the eccentric through a substantial arc produces only a slight forward movement of the cover-plate. The device also works very smoothly because of the fact that the bearing surfaces are machined. Thus the apertures 20 and 21 are drilled holes and the eccentric and eccentric collar have machined surfaces. The apertures for receiving the pivot pin 30 are also preferably drilled holes.

It is to be understood, however, that the clearances between the cover-plate and valve seat need not be so great as to necessitate complete movement of the eccentric through 180° to effect closure. In fact, in practice it is desirable to so proportion the clearance that the gate may be fully closed in response to rotation of the eccentric through about 120°, when the gate is new. This permits further movement of the gate, to effect a tight seal, as the gasket 10 becomes worn or indented, and also allows for variations in manufacture. It has been found that there is sufficient frictional resistance to rotation of the eccentric to retain it in a position to which it has been moved by the hand-wheel 19 even though it has not been moved clear into dead center position as shown in Fig. 6.

To limit rotation of the shaft 18 and the eccentric 26 to 180°, a shoulder 31 is provided on the upper member 12 of the carriage 11, which shoulder engages the outer surface of the eccentric collar 27 if the eccentric is moved in a direction to shift its center line to the right of the center line of the shaft 18.

The cover-plate may be moved vertically into any desired position by lifting or dropping the hand-wheel 19, and it then may be locked in any position of elevation by rotating the hand-wheel 19 to rotate the eccentric 26 and force the cover-plate 9 against either the seat 7 or the flange 8 on the base-plate 1.

In many instances gates of the type described are installed in stand pipes, or the like, in which the shaft 18 is reltively long and a hand-wheel 19 may be positioned a relatively great distance above the gate. It is desirable, under such conditions, to provide means for ordinarily preventing the carriage 11 from being lifted clear of the guides 5 while permitting complete removal of the carriage if it is desired to inspect or make repairs on the gate or carriage mechanism. To this end I preferably provide on the upper end of one of the side walls 3, a latch 32 which is pivotally mounted by a pin 33 to the front edge of the side wall 3. This latch 32 has a shoulder 34 projecting into the path of the carriage 11 so that the carriage cannot pass the latch. The latch is normaly retained in the position shown in Fig. 1 by a second arm 35 thereon which has sufficient weight to maintain it in the position shown. However, by extending a wire 36 from the arm 35 up to a point at the top of the stand pipe adjacent the hand-wheel 19, the carriage and cover mechanism may be removed from the base-plate 1 by first pulling on the wire 36 to rotate the latch arm 34 out of the path of the carriage and then lifting the carriage and cover-plate away from the base-plate on the shaft 18.

Various changes can be made in the construction shown, without departing from the essential principles of the invention. One modification is illustrated in Figs. 7 and 8 in which corresponding parts bear the same reference numerals as those in the remaining figures, with the suffix "a" attached. This construction differs from that previously described only in that the shaft 18a is eccentrically mounted in the bushings 22a and 23a and the member 26a is a concentric hub instead of an eccentric. Obviously, if desired, both the member 26a and the bushings 22a and 23a can be eccentrically mounted. The structure shown in Fig. 7 functions exactly the same as that shown in Fig. 3 insofar as the final result is concerned. The only difference is that in Fig. 7 the shaft 18a and hub 26a gyrate about the axis of rotation of the eccentric bushings 22a and 23a, whereas in Fig. 3 the shaft 18 and eccentric 26 rotate about the axis of the shaft.

Having fully described the preferred embodiments of this invention, it is to be understood that I do not limit myself to the exact construction herein set forth, but only to the extent set forth in the appended claims.

I claim:

1. In a head gate construction including a base plate having a water passage therethrough surrounded by a cover plate seat and having guides on said base plate positioned on opposite sides of said passage, a cover plate carriage slidably supported by said guides, said carriage comprising a pair of vertically spaced cross members connected together at their outer ends by vertical members to define therebetween a rectangular window in said carriage, a cover plate on said carriage, and means for slidably supporting said cover plate on said carriage comprising fingers projecting forwardly from said cover plate and engaging the four corners of said window, a control shaft rotatably mounted in said cross members, and means coupling said cover plate to said control shaft to slide said cover plate toward and away from said carriage, said cover plate being prevented from lateral movement in all other directions by said fingers and said window.

2. In a head gate construction including a base plate having a water passage therethrough surrounded by a cover plate seat, guides on said base plate positioned on opposite sides of said passage, a cover plate carriage slidably supported by said guides, said carriage comprising two vertically spaced cross members connected at their outer ends by vertical members to define therebetween a rectangular window in said carriage, a cover plate on said carriage and having a pair of finger members projecting forwardly of said cover plate into said window, each of said fingers simultaneously engaging one of said cross members and one of said vertical members to slidably support said cover plate on said carriage to prevent lateral displacement thereof in any direction, a control shaft rotatably mounted in said cross members, and means coupling said cover plate to said control shaft to slide said cover plate in a straight line toward and away from said carriage.

FRANK P. SNOW.